US012615428B2

(12) United States Patent (10) Patent No.: US 12,615,428 B2
Choi et al. (45) Date of Patent: Apr. 28, 2026

(54) METHOD OF PROCESSING IMAGE AND ELECTRONIC DEVICE FOR PERFORMING SAME

(71) Applicant: Samsung Electronics Co., Ltd., Suwon-si (KR)

(72) Inventors: Jaesung Choi, Suwon-si (KR); Wonjoon Do, Suwon-si (KR); Woojhon Choi, Suwon-si (KR); Sungoh Kim, Suwon-si (KR); Valeriy Prushinskiy, Suwon-si (KR); Kisuk Sung, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 18/482,568

(22) Filed: Oct. 6, 2023

(65) Prior Publication Data

US 2024/0040228 A1 Feb. 1, 2024

Related U.S. Application Data

(63) Continuation of application No. PCT/KR2022/005363, filed on Apr. 13, 2022.

(30) Foreign Application Priority Data

Apr. 13, 2021 (KR) ........................ 10-2021-0048044

(51) Int. Cl.
H04N 23/57 (2023.01)
H04N 23/63 (2023.01)
H04N 23/84 (2023.01)

(52) U.S. Cl.
CPC ........... *H04N 23/57* (2023.01); *H04N 23/632* (2023.01); *H04N 23/633* (2023.01); *H04N 23/84* (2023.01)

(58) Field of Classification Search
CPC .... H04N 23/57; H04N 23/632; H04N 23/633; H04N 23/84; H04N 23/81
See application file for complete search history.

(56) References Cited

U.S. PATENT DOCUMENTS

| 10,057,541 B2 | 8/2018 | Chung et al. |
| 11,082,547 B2 | 8/2021 | Xu et al. |

(Continued)

FOREIGN PATENT DOCUMENTS

| CN | 111953899 A | 11/2020 |
| JP | 2000-010145 A | 1/2000 |

(Continued)

OTHER PUBLICATIONS

International Search Report dated Jul. 22, 2022, issued in International Patent Application No. PCT/KR2022/005363.

*Primary Examiner* — Timothy J Henn
(74) *Attorney, Agent, or Firm* — Jefferson IP Law, LLP

(57) ABSTRACT

A technology for an electronic device to process images is provided. The electronic device identifies status of target pixels included in an area of a display module corresponding to a camera module located underneath the display module when the camera module is operated, obtains display information of the target pixels when the target pixels are on, determines offset information of pixels included in a captured image obtained from the camera module, based on the display information of the target pixels, and corrects the captured image, based on the determined offset information.

16 Claims, 13 Drawing Sheets

(56) References Cited

U.S. PATENT DOCUMENTS

| | | | |
|---|---|---|---|
| 11,153,520 B2 | 10/2021 | Park et al. | |
| 11,328,679 B2 | 5/2022 | Jinno | |
| 11,422,298 B2 | 8/2022 | Ota et al. | |
| 11,422,662 B2 | 8/2022 | Lee et al. | |
| 11,611,058 B2 | 3/2023 | Chen et al. | |
| 2006/0177207 A1* | 8/2006 | Bang | H04N 23/68 |
| | | | 348/E5.046 |
| 2013/0342472 A1* | 12/2013 | Guard | G09G 3/2003 |
| | | | 345/173 |
| 2015/0163392 A1* | 6/2015 | Malone | H04N 23/745 |
| | | | 348/228.1 |
| 2016/0111062 A1 | 4/2016 | Hicks | |
| 2017/0150030 A1* | 5/2017 | Nakamura | H04N 25/67 |
| 2018/0114493 A1 | 4/2018 | Mclaughlin | |
| 2020/0074959 A1 | 3/2020 | Bhat et al. | |
| 2020/0389575 A1* | 12/2020 | Gove | H04N 13/239 |
| 2021/0240026 A1 | 8/2021 | Yeke Yazdandoost et al. | |
| 2021/0325943 A1 | 10/2021 | Kwak et al. | |
| 2022/0116519 A1* | 4/2022 | Nikhara | H04N 23/57 |
| 2022/0159162 A1* | 5/2022 | Sun | G06T 5/50 |
| 2022/0171097 A1 | 6/2022 | Zhang | |
| 2022/0208142 A1* | 6/2022 | Yang | H04N 23/74 |
| 2024/0040265 A1* | 2/2024 | Park | G09G 5/12 |
| 2024/0177647 A1* | 5/2024 | He | G09G 3/2074 |

FOREIGN PATENT DOCUMENTS

| | | | |
|---|---|---|---|
| JP | 2018-148318 A | 9/2018 | |
| JP | 2020-034747 A | 3/2020 | |
| JP | 2020-198586 A | 12/2020 | |
| JP | 2021-509964 A | 4/2021 | |
| KR | 10-0594973 B1 | 6/2006 | |
| KR | 10-2012-0071963 A | 7/2012 | |
| KR | 10-1691310 B1 | 12/2016 | |
| KR | 10-2018-0136386 A | 12/2018 | |
| KR | 10-2019-0084397 A | 7/2019 | |
| KR | 10-2046220 B1 | 11/2019 | |
| KR | 10-2020-0014408 A | 2/2020 | |
| KR | 10-2020-0048609 A | 5/2020 | |
| KR | 10-2020-0060118 A | 5/2020 | |
| KR | 10-2020-0140327 A | 12/2020 | |
| WO | 2020/219267 A1 | 10/2020 | |

* cited by examiner

<R or G or B>

<OFFSET IMAGE 1>

<R or G or B>

<OFFSET IMAGE 2>

1

METHOD OF PROCESSING IMAGE AND ELECTRONIC DEVICE FOR PERFORMING SAME

CROSS-REFERENCE TO RELATED APPLICATION(S)

This application is a continuation application, claiming priority under § 365(c), of an International application No. PCT/KR2022/005363, filed on Apr. 13, 2022, which is based on and claims the benefit of a Korean patent application number filed on Apr. 13, 2021, in the Korean Intellectual Property Office, the disclosure of which is incorporated by reference herein in its entirety.

BACKGROUND

1. Field

The disclosure relates to a method of processing an image and electronic device for performing the method.

2. Description of Related Art

Manufacturers, having made smartphones larger and larger in size, started to work on methods to reduce the thickness of bezels of the smartphone by increasing the screen size while leaving the terminal size as it is. As one of the methods to reduce the thickness of the bezel, a notch design method has been developed to minimize areas other than a display area in the upper bezel of the smartphone. However, it is not possible to remove a front camera area from the upper bezel, making it difficult to configure the front surface of the upper bezel as a display area.

To deal with this, an under display camera (UDC) technology implemented underneath the display is being actively studied. In the case of applying the UDC technology, the entire upper end of the smartphone is configured as a display area, raising the quality in design and providing an environment for the user to immerse him/herself in information displayed in the display area. However, an image captured by the UDC may have various optical problems due to the structure that the camera is positioned underneath the display.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an image processing technology to correct an image captured by an under display camera (UDC).

This disclosure relates to a technology for an electronic device to process images.

Additional aspects will be set forth in part in the description which follows and, in part, will be apparent from the description, or may be learned by practice of the presented embodiments.

In accordance with an aspect of the disclosure, an electronic device is provided. The electronic device identifies status of target pixels included in an area of a display panel corresponding to a camera package located underneath the display panel when the camera package is operated, obtain display information of the target pixels when the target pixels are on, determine offset information of pixels included in a captured image obtained from the camera package based on the display information of the target pixels, and correct the captured image, based on the determined offset information.

In accordance with another aspect of the disclosure, a method by which an electronic device processes an image is provided. The method includes identifying status of target pixels included in an area of a display panel corresponding to a camera package located underneath the display panel when the camera package is operated in electronic device, obtaining display information of the target pixels when the target pixels are on, determining offset information of pixels included in a captured image obtained from the camera package, based on the display information of the target pixels, and correcting the captured image, based on the determined offset information.

In accordance with another aspect of the disclosure, an electronic device for processing an image is provided. The electronic device includes a memory configured to store one or more instructions, a display panel, a camera package located underneath the display panel, and at least one processor configured to execute the one or more instructions stored in the memory, wherein the at least one processor is configured to identify status of target pixels included in an area of a display panel corresponding to a camera package located underneath the display panel when the camera package is operated, obtain display information of the target pixels when the target pixels are on, determine offset information of pixels included in a captured image obtained from the camera package, based on the display information of the target pixels, and correct the captured image, based on the determined offset information.

In accordance with another aspect of the disclosure, a computer program product including a recording medium storing a program for causing an electronic device to perform a method processing an image is provided. The computer program product is configured to perform operations of identifying status of target pixels included in an area of a display panel corresponding to a camera package located underneath the display panel when the camera package is operated, obtaining display information of the target pixels when the target pixels are on, determining offset information of pixels included in a captured image obtained from the camera package, based on the display information of the target pixels, and correcting the captured image, based on the determined offset information.

According to an embodiment, an electronic device may have more effectively enhanced quality of a captured image obtained from a camera package by correcting the captured image with consideration for light generated from target pixels of a display panel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
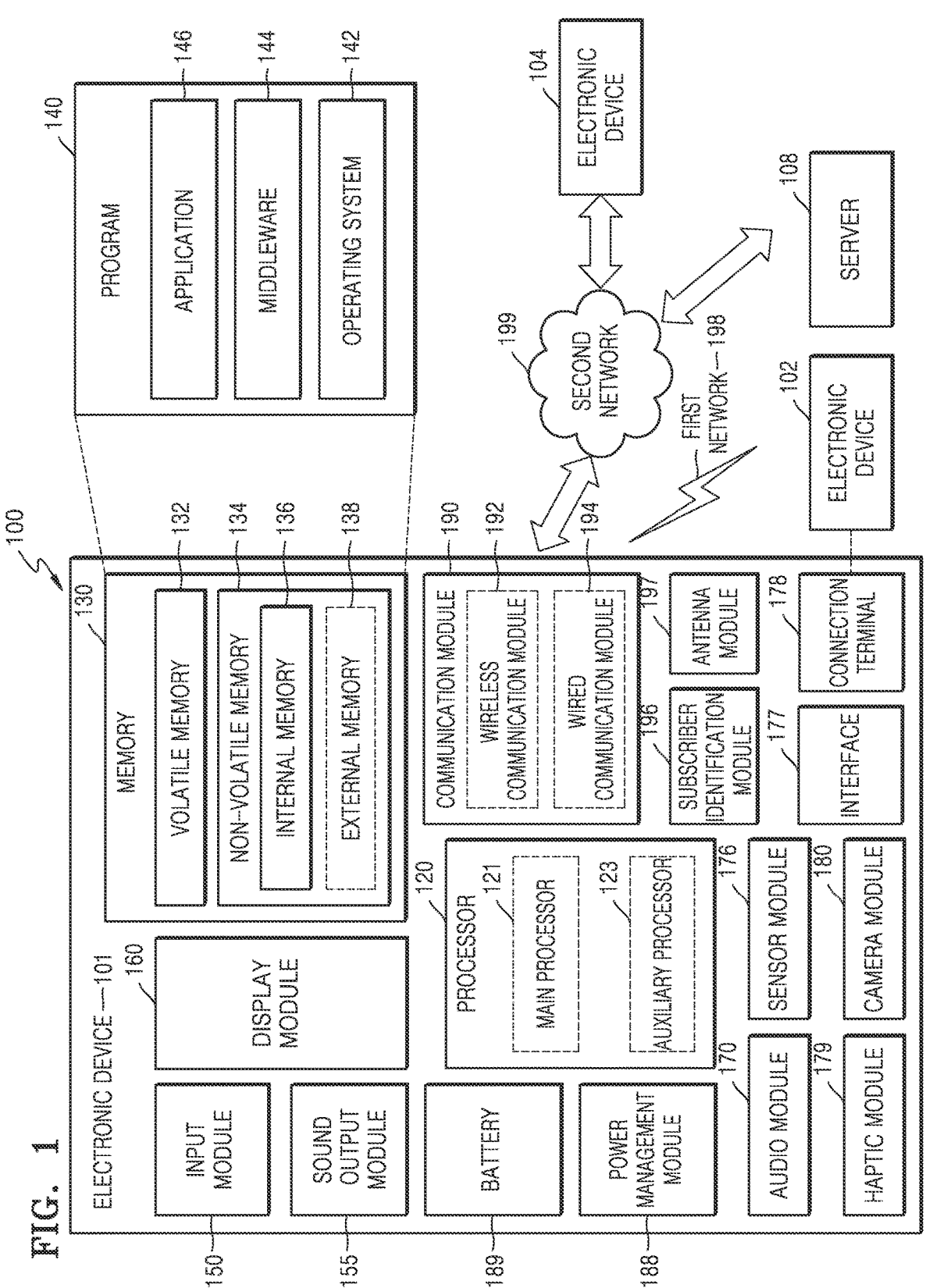
FIG. 1 is a block diagram of an electronic device in a network environment, according to an embodiment of the disclosure.

FIG. 1 is a block diagram of an electronic device in a network environment, according to an embodiment of the disclosure.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (196) or an antenna module 197. In an embodiment, at least one of the components (e.g., the connection terminal 178) may be omitted or one or more other components may be added to the electronic device 101. In an embodiment, some of the components (e.g., the sensor module 176, the camera module 180 or the antenna module 197) may be integrated into one component (e.g., the display module 160).

For example, the processor 120 may execute software (e.g., a program 140) to control at least one other component (e.g., hardware or software component) of the electronic device 101 and perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resultant data in a non-volatile memory 134. In an embodiment, the processor 120 may include a main processor 121 (e.g., a central processing unit or an application processor) or an auxiliary processor 123 operable independently or together (e.g., a graphic processing unit, a neural processing unit (NPU), an image signal processor, a sensor hub processor, or a communication processor). For example, when the electronic device 101 includes the main processor 121 and the auxiliary processor 123, the auxiliary processor 123 may be configured to use lower power than the main processor 121 or specialize in a dedicated function. The auxiliary processor 123 may be implemented as separate from, or part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application).

In an embodiment, the auxiliary processor 123 (e.g., an image signal processor or a communication processor) may be implemented as part of another component (e.g., the camera module 180 or the communication module 190)

functionally related thereto. In an embodiment, the auxiliary processor 123 (e.g., an NPU) may include a hardware structure specialized in processing an artificial intelligence (AI) model.

The AI model may be generated by machine learning. Such learning may be performed by e.g., the electronic device 101 itself that performs the AI model, or may be performed by a separate server (e.g., the server 108). A learning algorithm may include e.g., supervised learning, unsupervised learning, semi-supervised learning, or reinforcement learning, without being limited thereto. The AI model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of them, without being limited thereto. Additionally or alternatively, the AI model may include a software structure in addition to the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system 142, middleware 144, or an application 146.

The input module 150 may receive a command or data to be used by a component (e.g., the processor 120) of the electronic device 101 from outside (e.g., a user) of the electronic device 101. The input module 150 may include, for example, a microphone, a mouse, a keyboard, a key (or button), or a digital pen (e.g., a stylus pen).

The sound output module 155 may output a sound signal to the outside of the electronic device 101. The sound output module 155 may include e.g., a speaker or a receiver. The speaker may be used for general purposes such as multimedia playback or transcription playback. The receiver may be used to receive incoming calls. In an embodiment, the receiver may be implemented as separate from, or part of the speaker.

The display module 160 may visually provide information to the outside (e.g., a user) of the electronic device 101. The display module 160 may include e.g., a display, a hologram device or a projector and a control circuit for controlling the device. In an embodiment, the display module 160 may include a touch sensor configured to detect a touch or a pressure sensor configured to measure intensity of force generated by the touch.

The audio module 170 may convert a sound to an electrical signal, or vice versa. In an embodiment, the audio module 170 may obtain a sound through the input module 150, or output a sound through the sound output module 155 or an external electronic device (e.g., the electronic device 102) (e.g., a speaker or a headphone) connected directly or wirelessly to the electronic device 101.

The sensor module 176 may detect an operation condition (e.g., power or temperature) of the electronic device 101 or an external environment condition (e.g., a user condition), and generate an electric signal or a data value corresponding to the detected condition. In an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols to be used by the electronic device 101 to directly or wirelessly connect to an external electronic device (e.g., the electronic device 102). In an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected to the external electronic device (e.g., the electronic device 102). In an embodiment, the connection terminal 178 may include, for example, an HDMI connector, a USB connector, an SD card connector, or an audio connector (e.g., a headphone connector).

The haptic module 179 may convert an electric signal into a mechanical stimulus (e.g. a vibration or motion) or electrical stimulus which may be recognized by a user via his tactile sensation or kinesthetic sensation. In an embodiment, the haptic module 179 may include, for example, a motor, a piezoelectric element, or an electric stimulator.

The camera module 180 may capture a still image and a moving image. In an embodiment, the camera module 180 may include one or more lenses, image sensors, image signal processors, or flashes.

The power management module 188 may manage electrical power supplied to the electronic device 101. In an embodiment, the power management module 188 may be implemented as e.g., at least part of a power management integrated circuit (PMIC).

The battery 189 may supply power to at least one component of the electronic device 101. In an embodiment, the battery 189 may include, for example, a primary cell which is not rechargeable, a secondary cell which is rechargeable, or a fuel cell.

The communication module 190 may support establishment of a direct (e.g., wired) communication channel or a wireless communication channel between the electronic device 101 and an external electronic device (e.g., the electronic device 102, the electronic device 104, or the server 108), and communication through the established communication channel. The communication module 190 may include one or more communication processors operated separately from the processor 120 (e.g., an application processor) and supporting direct (e.g., wired) communication or wireless communication. In an embodiment, the communication module 190 may include a wireless communication module 192 (e.g., a cellular communication module, a short-range wireless communication module or a global navigation satellite system (GNSS) communication module) or a wired communication module 194 (e.g., a local area network (LAN) communication module or a power-line communication module). A corresponding one of the communication modules may communicate with an external electronic device 104 over the first network 198 (e.g., a short-range communication network such as Bluetooth, wireless-fidelity (Wi-Fi) direct or infrared data association (IrDA)) or the second network 199 (e.g., a remote communication network such as a legacy cellular network, a fifth generation (5G) network, a next generation communication network, the Internet, or a computer network (e.g., a LAN or wide area network (WAN)). These various types of communication modules may be integrated into a single component (e.g., a single chip) or implemented as a plurality of separate components (e.g., a plurality of chips). The wireless communication module 192 may use subscriber information (e.g., international mobile subscriber identity (IMSI)) stored in the subscriber identification module 196 to authorize or authenticate the electronic device 101 in the communication network such as the first network 198 or the second network 199.

The wireless communication module 192 may support a 5G network after the fourth generation (4G) network and a next generation communication technology, e.g., a new radio (NR) access technology. The NR access technology may support high-speed transfer of high-volume data (enhanced mobile broadband (eMBB)), minimization of user equipment (UE) power and access of multiple UEs (massive machine type communication (mMTC)), or high reliability and low latency (ultra-reliable and low-latency communication (URLLC)). The wireless communication module 192 may support, e.g., high-frequency band (e.g., millimeter wave (mmWave) band) to attain a high data transfer rate. The wireless communication module 192 may support various technologies to guarantee performance in the high-frequency band, e.g., beamforming, massive multiple-input and multiple-output (MIMO), full dimensional MIMO (FD-MIMO), array antenna, analog beamforming, or large-scale antenna. The wireless communication module 192 may support various requirements prescribed for the electronic device 101, an external electronic device (e.g., the electronic device 104) or a network system (e.g., the second network 199). In an embodiment, the wireless communication module 192 may support a peak data rate for fulfilling eMBB (e.g., 20 gigabits per second (Gbps) or higher), loss coverage for fulfilling mMTC (e.g., 164 dB or less), or user plane (U-plane) latency for fulfilling URLLC (e.g., 0.5 millisec-onds (ms) or less for downlink (DL) and uplink (UL) or 1 ms or less for round trip).

The antenna module 197 may transmit or receive a signal or power to or from the outside (e.g., to an external electronic device). In an embodiment, the antenna module 197 may include an antenna including a conductor or a radiator formed in a conductive pattern formed on a substrate (e.g., a printed circuit board (PCB)). In an embodiment, the antenna module 197 may include a plurality of antennas (e.g., array antennas). In this case, at least one antenna suitable for a communication scheme used in a communication network, such as the first network 198 or the second network 199, may be selected, for example, by the communication module 190 from among the plurality of antennas. The signal or power may be transmitted or received between the communication module 190 and the external electronic device through the at least one selected antenna. In an embodiment, a component (e.g., a radio frequency integrated circuit (RFIC)) other than the radiator may be additionally formed as part of the antenna module 197. In various embodiments, the antenna module 197 may form an mmWave antenna module. In an embodiment, the mmWave antenna module may include a PCB, an RFIC arranged on or adjacent to a first surface (e.g., the lower surface) of the PCB to support a designated high-frequency band (e.g., mmWave band), and a plurality of antennas (e.g., array antennas) arranged on or adjacent to a second surface (e.g., the upper surface or side surface) of the PCB to transmit or receive a signal in the designated high-frequency band.

At least some of the components may be interconnected in an inter-peripheral communication method (e.g., a bus, a general purpose input and output (GPIO), a serial peripheral interface (SPI), or a mobile industry processor interface (MIPI)) to exchange a signal (command or data) with one another.

In an embodiment, the command or data may be transmitted or received between the electronic device 101 and the external electronic device 104 through the server 108 connected to the second network 199. Each of the external electronic devices 102 or 104 may be a device of a same type as or a different type from the electronic device 101. In an embodiment, all or part of operations executed in the electronic device 101 may be executed in one or more of the external electronic devices 102 or 104 or the server 108. For example, when the electronic device 101 needs to perform a function or service automatically or in response to a request from the user or another device, the electronic device 101 requests one or more of external electronic devices to perform the at least part of the function or service instead of or in addition to executing the function or service by itself. The one or more external electronic devices receiving the request may perform the at least part of the function or the service requested, or an additional function or service related to the request and send an outcome of the performing to the electronic device 101. The electronic device 101 may process the outcome as it is or in addition, and provide the result as part of a response to the request. For this, for example, cloud computing, distributed computing, mobile edge computing (MEC), or client-server computing technologies may be used. The electronic device 101 use e.g., the distributed computing or mobile edge computing to provide an ultra-low-latency service. In another embodiment, the external electronic device 104 may include an Internet of things (IoT) device. The server 108 may be an intelligent server that uses machine learning and/or a neural network. In an embodiment, the external electronic device 104 or the server 108 may be included in the second network 199. The electronic device 101 may be applied for intelligent services (e.g., smart home, smart city, smart car, or health care) based on the 5G communication technology and the IoT related technology.

Figure 2:
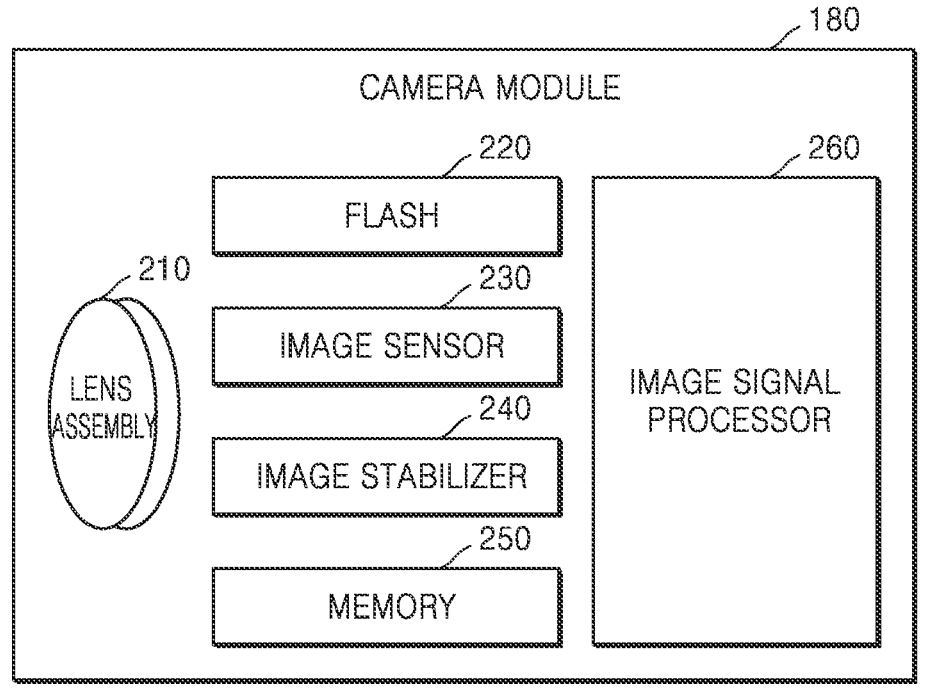
FIG. 2 is a block diagram illustrating a camera module, according to an embodiment of the disclosure.

FIG. 2 is a block diagram illustrating a camera module, according to an embodiment of the disclosure.

Referring to FIG. 2, the camera module 180 may include a lens assembly 210, a flash 220, an image sensor 230, an image stabilizer 240, a memory 250 (e.g., a buffer memory), or an image signal processor 260. The lens assembly 210 may collect light emitted from a subject, which is an object to be captured. The lens assembly 210 may include one or more lenses. In an embodiment, the camera module 180 may include the lens assembly 210 in the plural. In this case, the camera module 180 may form e.g., a dual camera, a 360-degree camera, or a spherical camera. Some of the plurality of lens assemblies 210 may have the same lens attributes (e.g., viewing angle, focal length, auto focus, f number, or optical zoom), or at least one lens assembly may have one or more different lens attributes from those of the other lens assemblies. The lens assembly 210 includes, for example, a wide-angle lens or a telephoto lens.

The flash 220 may emit light to be used to reinforce the light emitted or reflected from the subject. In another embodiment, the flash 220 may include one or more light emitting diodes (LEDs), e.g., red-green-blue (RGB) LEDs, white LEDs, infrared LEDs, or ultraviolet LEDs, or a xenon lamp.

The image sensor 230 may obtain an image corresponding to the subject by converting the light emitted or reflected from the subject and delivered through the lens assembly 210 to an electric signal. In another embodiment, the image sensor 230 may include an image sensor selected from among, for example, an RGB sensor, a black and white (BW) sensor, an infrared (IR) sensor, or an ultraviolet (UV) sensor having different attributes, a plurality of image sensors having the same attributes, or a plurality of image sensors having different attributes. Each image sensor included in the image sensor 230 may be implemented using a charged coupled device (CCD) sensor or a complementary metal oxide semiconductor (CMOS) sensor.

The image stabilizer 240 may move at least one lens included in the lens assembly 210 or the image sensor 230 in a certain direction or control operation characteristics (e.g., read-out timing) of the image sensor 230, in response to a movement of the camera module 180 or the electronic device 101 including the camera module 180. This compensates for at least some of negative influences on the image being captured due to the movement. In an embodiment, the image stabilizer 240 may use a gyro sensor (not shown) or an acceleration sensor (not shown) arranged inside or outside the camera module 180 to detect the movement of the camera module 180 or the electronic device 101. In an embodiment, the image stabilizer 240 may be implemented as e.g., an optical image stabilizer.

The memory 250 may at least temporarily store at least a portion of an image obtained through the image sensor 230 for the next image processing task. For example, when obtaining an image is delayed or a plurality of images are obtained at high speed by using a shutter, an original image obtained (e.g., a Bayer-patterned image or a high-resolution image) is stored in the memory 250 and a corresponding copy image (e.g., a low-resolution image) is previewed through the display module 160. Afterward, when a specified condition is satisfied (e.g., there is a user input or a system command), at least a portion of the original image stored in the memory 250 may be obtained and processed by the image signal processor 260. In an embodiment, the memory 250 may be configured as at least a part of the memory 130 or as an extra memory operated separately from the memory 130.

The image signal processor 260 may perform one or more image processes on an image obtained through the image sensor 230 or an image stored in the memory 250. The one or more image processes may include, for example, depth map generation, three-dimensional (3D) modeling, panorama generation, feature point extraction, image synthesis, or image compensation (e.g., noise reduction, resolution adjustment, brightness adjustment, blurring, sharpening, or softening). Additionally or alternatively, the image signal processor 260 may control (e.g., control exposure time or read-out timing) at least one (e.g., the image sensor 230) of the components included in the camera module 180. An image processed by the image signal processor 260 may be stored back in the memory 250 for further processing or provided to an external component (e.g., the memory 130, the display module 160, the electronic device 102, the electronic device 104 or the server 108) of the camera module 180. In an embodiment, the image signal processor 260 may be configured as at least a part of the processor 120 or configured as an extra processor operated separately from the processor 120. In the case that the image signal processor 260 is configured as a separate processor from the processor 120, at least one image processed by the image signal processor 260 may be displayed on the display module 160 as it is or after being subjected to further image processing by the processor 120.

In an embodiment, the electronic device 101 may include a plurality of camera modules 180 having different attributes or functions. In this case, for example, at least one of the plurality of camera modules 180 is a wide-angle camera and at least another one is a telephoto camera. Similarly, at least one of the plurality of camera modules 180 may be a front camera and at least another one may be a rear camera.

Figure 3:
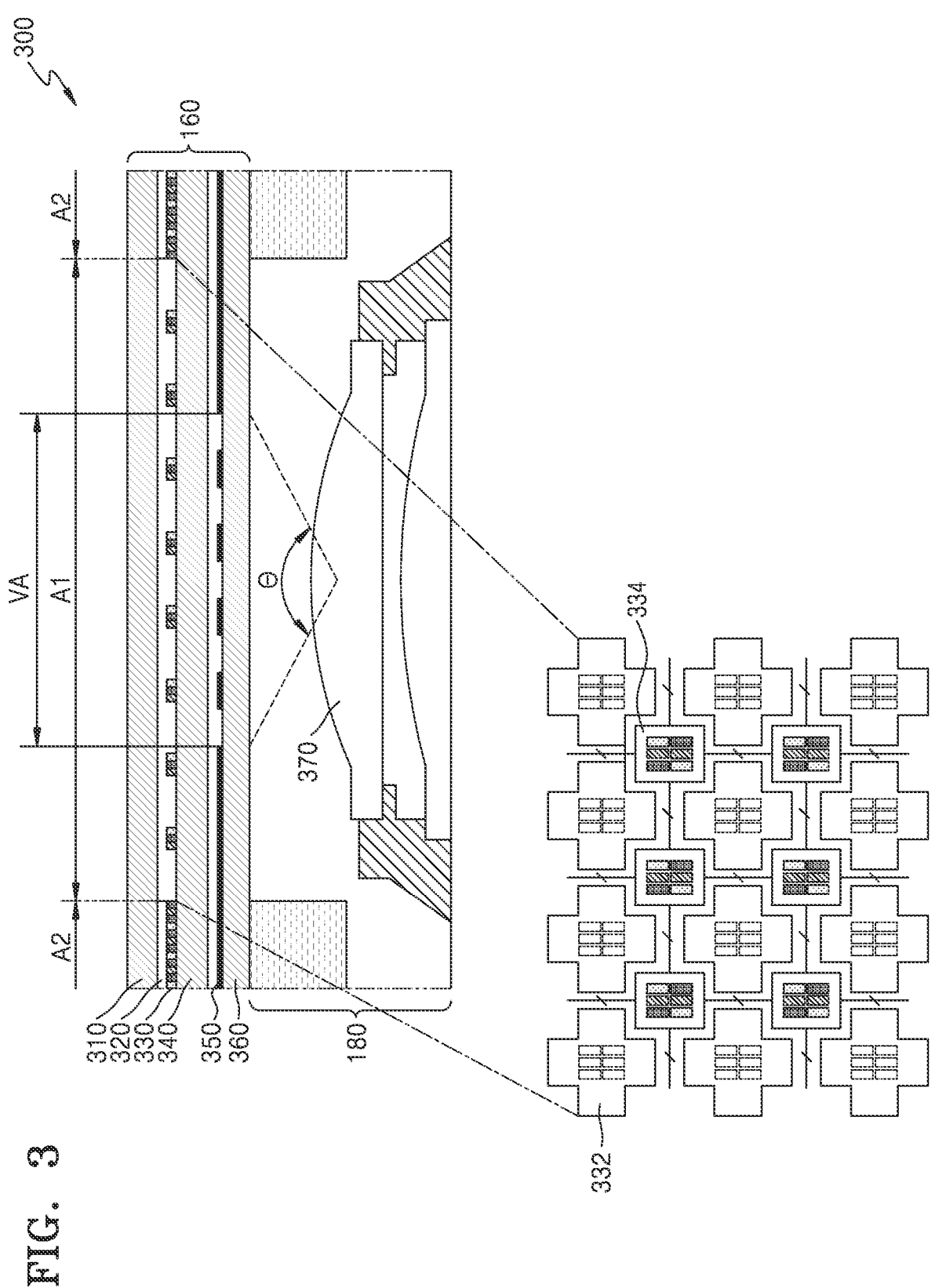
FIG. 3 is a diagram for describing a display module and a camera module, according to an embodiment of the disclosure.

FIG. 3 is a diagram for describing a display module and a camera module, according to an embodiment of the disclosure.

Referring to FIG. 3, the display module 160 may include a plurality of glass panels 310 and 360, an organic material layer 320, a pixel layer 330, a wiring layer 340 and a mask layer 350. However, not all the illustrated components are essential. The display module 160 may be implemented with more or fewer components than illustrated ones.

In the display module 160, the organic material layer 320, the pixel layer 330, the wiring layer 340 and the mask layer 350 may be laminated between the first glass panel 310 and the second glass panel 360.

The organic material layer 320 may include a light-emitting material, and may generate light by electroluminescence when electricity is applied to the organic material layer 320. Furthermore, the organic material layer 320 may include several auxiliary layers to facilitate flows of electrons and holes which produce electroluminescence.

The pixel layer 330 may include a plurality of pixels, each of which may include subpixels included in RGB channels. Furthermore, the pixel layer 330 may be divided into area A1 and area A2 based on whether to remove pixels. In the area A1, some pixels may be removed for image capturing of the camera module 180. Accordingly, there may be a portion 332 where pixels are removed and a portion 334 where pixels are not removed in the area A1. The area A2 refers to an area from which pixels are not removed.

The wiring layer 340 may include wires for supplying power to the display module 160, and the wires may connect a power source to at least one component included in the display module 160.

The mask layer 350 may serve to block transmission of light, and may be located between the wiring layer 340 and the second glass panel 360. On the mask layer 350, a mask may be removed from at least a portion of a viewing angle (VA) area corresponding to a viewing angle of the camera. For example, in the VA area, the mask on a portion corresponding to a portion where pixels are removed on the pixel layer 330 may be removed.

The camera module 180 may be located underneath the display module 160. One or more lenses, e.g., 370, may be included in the camera module 180. However, it is merely an example, and the camera module 180 may include various components other than the lens 370, as described above in FIG. 2. Moreover, in the disclosure, the camera module 180 may be referred to as an under display camera (UDC).

The camera module 180 may capture an image by detecting light transmitted through the portion where pixels and mask are removed from the display module 160. By the way, in the case that the camera module 180 is located underneath the display module 160, the light generated from the display module 160 may have an influence on the captured image. Hence, an electronic device according to an embodiment may correct the captured image obtained by the camera module 180 with consideration for the light generated by the display module 160. Other embodiments of correcting the captured image in the electronic device will be described later in detail in connection with FIGS. 4 to 13.

Figure 4:
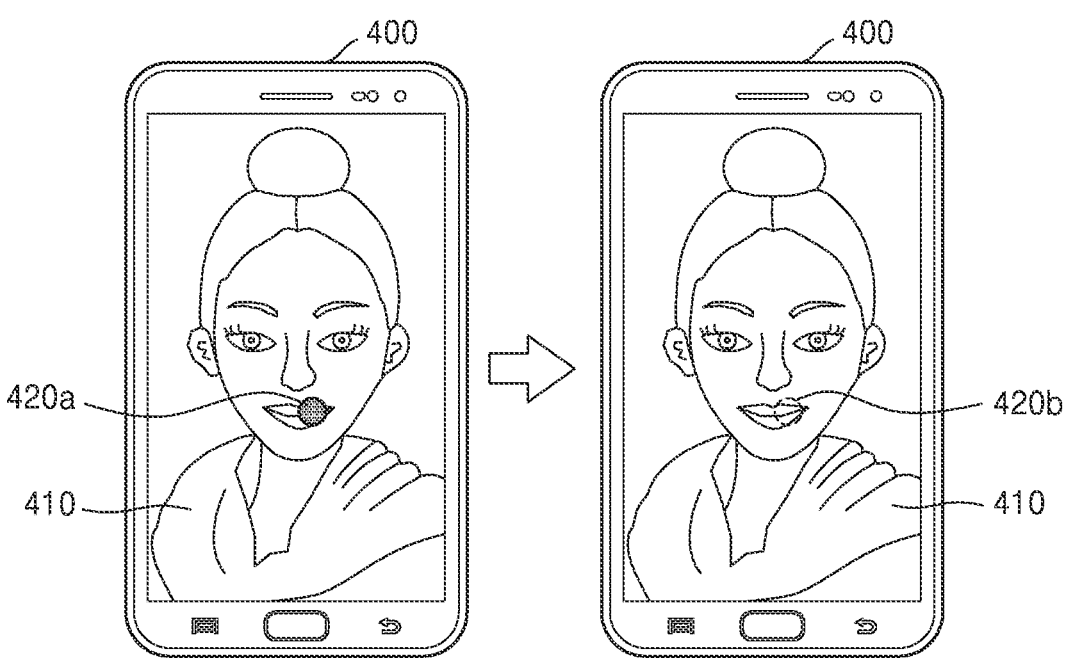
FIG. 4 illustrates screens of an electronic device in which a camera module is located underneath a display module, according to an embodiment of the disclosure.

FIG. 4 illustrates screens of an electronic device in which a camera module is located underneath a display module, according to an embodiment of the disclosure.

When the camera module is located underneath the display module, the light generated from a pixel in the display module may have an influence on the captured image of the camera module. However, when some pixels in the display module are off to prevent this issue, the screen may not be entirely displayed.

For example, referring to FIG. 4, it is seen that a portion of a screen 410 is lost when pixels in a location corresponding to the camera module are off (420a). On the other hand, when the pixels 420b in the location corresponding to the camera module are on (420b), the screen 410 may be displayed entirely.

In an embodiment, an electronic device 400 may determine status of the pixels of the display module corresponding to the camera module based on at least one preset criterion, in capturing an image with the camera module. The at least one preset criterion may include a user input, a surrounding condition of the electronic device 400 when the camera module is used, display settings information or shooting settings information. For example, on receiving a user input from the user to request to leave the pixels of the display module corresponding to the camera module on, the electronic device 400 leaves the pixels on. In another example, the electronic device 400 may leave the pixels of the display module corresponding to the camera module on when brightness of surroundings of the electronic device 400 is higher than a preset value. In another example, the electronic device 400 may leave the pixels of the display module corresponding to the camera module on when a content with high resolution or high frame rate is displayed on the display module. In another example, the electronic device 400 may leave the pixels of the display module corresponding to the camera module on when the shooting mode is set to a portrait mode. These are merely an example, and the criterion of determining status of the pixels of the display module corresponding to the camera module in the electronic device 400 is not limited to the above examples.

In an embodiment, the electronic device 400 provides a technology to correct a captured image obtained while the pixels of the display module are on for preventing quality degradation of the captured image while displaying the screen 410 entirely. In the meantime, the electronic device 400 may not perform the technology to correct the captured image according to the embodiment when determining based on the aforementioned at least one criterion to leave the pixels of the display module corresponding to the camera module off.

In an embodiment, the electronic device 400 may obtain display information of target pixels located in an area of the display module corresponding to the camera module when a shooting mode to operate the camera module is selected. The area of the display module corresponding to the camera module may be determined based on a viewing angle of a lens included in the camera module, which is merely an example, and may be changed according to settings. The pixels located in the area corresponding to the camera module will now be described as target pixels. The electronic device 400 may obtain at least one of pixel values for each color of the target values, degrees to which display devices of the target pixels emit light or a color correction matrix of the target pixels. It is, however, merely an example, and the display information of the target pixels is not limited to the above example.

The electronic device 400 may determine offset information of pixels included in a captured image obtained from the camera module based on the display information of the target pixels. The offset information is information used to remove a light element of the target pixels reflected in the captured image, and may be determined based on at least one of pixel values for each color of the target pixels, degrees to which display devices of the target pixels emit light or a color correction matrix. The electronic device 400 may correct the captured image based on the determined offset information. For example, the electronic device 400 corrects the captured image by subtracting the determined offset information from the values of pixels constituting the captured image.

Figure 5:
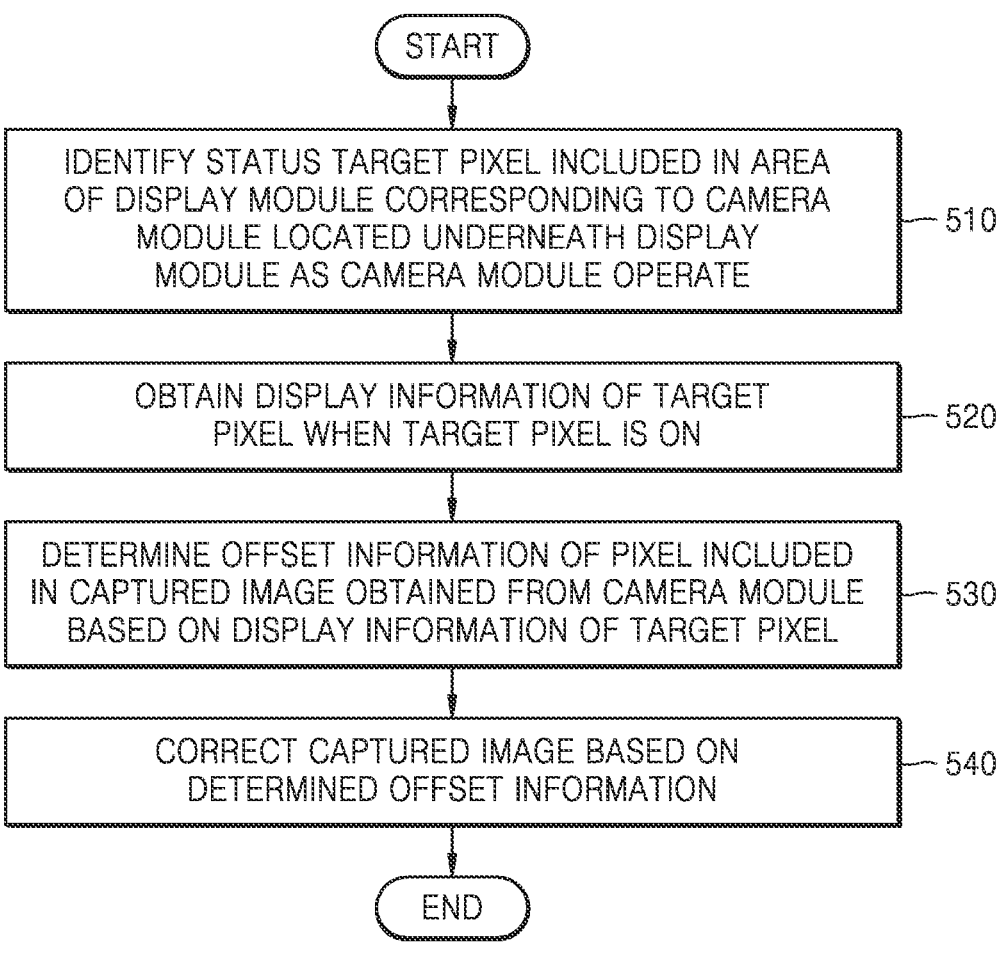
FIG. 5 is a flowchart for describing a method by which an electronic device corrects a captured image, according to an embodiment of the disclosure.

FIG. 5 is a flowchart for describing a method by which an electronic device corrects a captured image, according to an embodiment of the disclosure.

Referring to FIG. 5, in operation 510, an electronic device may identify status of target pixels included in an area of a display module corresponding to a camera module located underneath the display module when the camera module is operated.

The electronic device may include at least one camera module. At least some of the at least one camera module included in the electronic device may be located underneath the display module. The camera module located underneath the display module among the at least one camera module included in the electronic device will now be described.

The camera module may be operated as the user selects a shooting mode on the electronic device. For example, when the electronic device is requested to run a camera application, a shooting mode may be selected. In another example, even when a function of image capturing is performed by another application other than the camera application, a shooting mode may be selected.

The electronic device may identify status of target pixels included in an area of the display module corresponding to the camera module when the camera module is operated. The area of the display module corresponding to the camera module may be determined based on whether the light generated from the pixels included in the display module has an influence on an image captured by the camera. For example, the area of the display module corresponding to the camera module is determined based on the viewing angle of a lens included in the camera module. In the disclosure, pixels of the display module that have an influence on an image captured by the camera will be described as target pixels.

The electronic device may identify whether the target pixels are on or off. For example, the electronic device identifies whether the target pixels are on or off by identifying whether power is supplied to each of the target pixels. In another embodiment, the electronic device may manage the target pixels in blocks. The blocks refer to a group of a preset number of target pixels, and there may be a different number of target pixels included in each block. When the target pixels are managed in blocks, the electronic device may determine whether the target pixels included in each block are on or off by checking whether power is supplied to only one target pixel belonging to the block.

In operation 520, the electronic device may obtain display information of the target pixels displayed on the display module when the target pixels are on.

In an embodiment, the display information of the target pixels may include at least one of pixel values for each color of the target values, degrees to which display devices of the target pixels emit light or a color correction matrix of the target pixels. It is, however, merely an example, and the display information of the target pixels is not limited to the above example.

In operation 530, the electronic device may determine offset information of pixels included in a captured image obtained from the camera module based on the display information of the target pixels.

In an embodiment, the electronic device may determine offset information by combining display information of the target pixels based on preset weights. For example, when obtaining the pixel values for each color of the target pixels as the display information, the electronic device determines an average of the pixel values for each color as the offset information. It is, however, merely an example, and the electronic device may set a different weight for each position of the target pixel and combine the pixel values for each color of the target pixels.

In another embodiment, the electronic device may group the target pixels in blocks to determine the offset information. For example, a preset number of target pixels is grouped in one block, and there is the same or different number of target pixels for each block. The electronic device may store the offset information in advance for each block when the target pixels included in the block are on. For example, the electronic device stores tan average of the pixel value for each color when the target pixels included in the block are on as the offset information. In another example, the electronic device may store the offset information of the block in the form of an image, which will be described later in detail in connection with FIGS. 6 and 7. Furthermore, the electronic device may store the offset information of the block for each RGB channel.

In another embodiment, the electronic device may use an artificial intelligence (AI) model generated based on the display information of the target pixels to determine offset information. For example, the electronic device stores an AI model trained based on pixel values for each color of the target values, degrees to which the display devices of the target pixels emit light or the color correction matrix of the target pixels. The electronic device may obtain the offset information as an output value to be used for correction of the captured image by inputting the display information of the target pixels to the stored AI model. It is, however, merely an example, and the AI model may be stored in an external device in another example. When the AI model is stored in the external device, the electronic device may transmit the display information of the target pixels to the external device and in return, receive the offset information output from the AI model.

In operation 540, the electronic device may correct the captured image based on the determined offset information. In an embodiment, the electronic device may correct the captured image by subtracting the determined offset information from the pixel values of the captured image. It is, however, merely an example, and the method of correcting the captured image based on the offset information is not limited to the above example. In another example, when e.g., flickers occur during image capturing of the camera module, the electronic device may correct the image by considering the image quality distortion such as the flickers along with the offset information. This will be described in more detail with reference to FIG. 8.

In an embodiment, the electronic device may store the corrected captured image. It is, however, merely an example, and the electronic device may store the captured image obtained by the camera module and the offset information in another embodiment. The offset information may be stored as one of correction parameters for the captured image. For example, when the captured image is stored in a data file in a joint photographic experts group (JPEG) format, the offset information is stored in a tail area of JPEG. It is, however, merely an example, and the method of storing the offset information is not limited to the above example. In another embodiment, the electronic device may store the captured image obtained by the camera module and the corrected captured image.

In the meantime, a method of processing an image according to the disclosure may be performed based on display information of target pixels in a raw domain in which linearity is secured. It is, however, merely an example, and the display information of the target pixels is not limited to the information of the row domain when linearity is secured.

Figure 6:
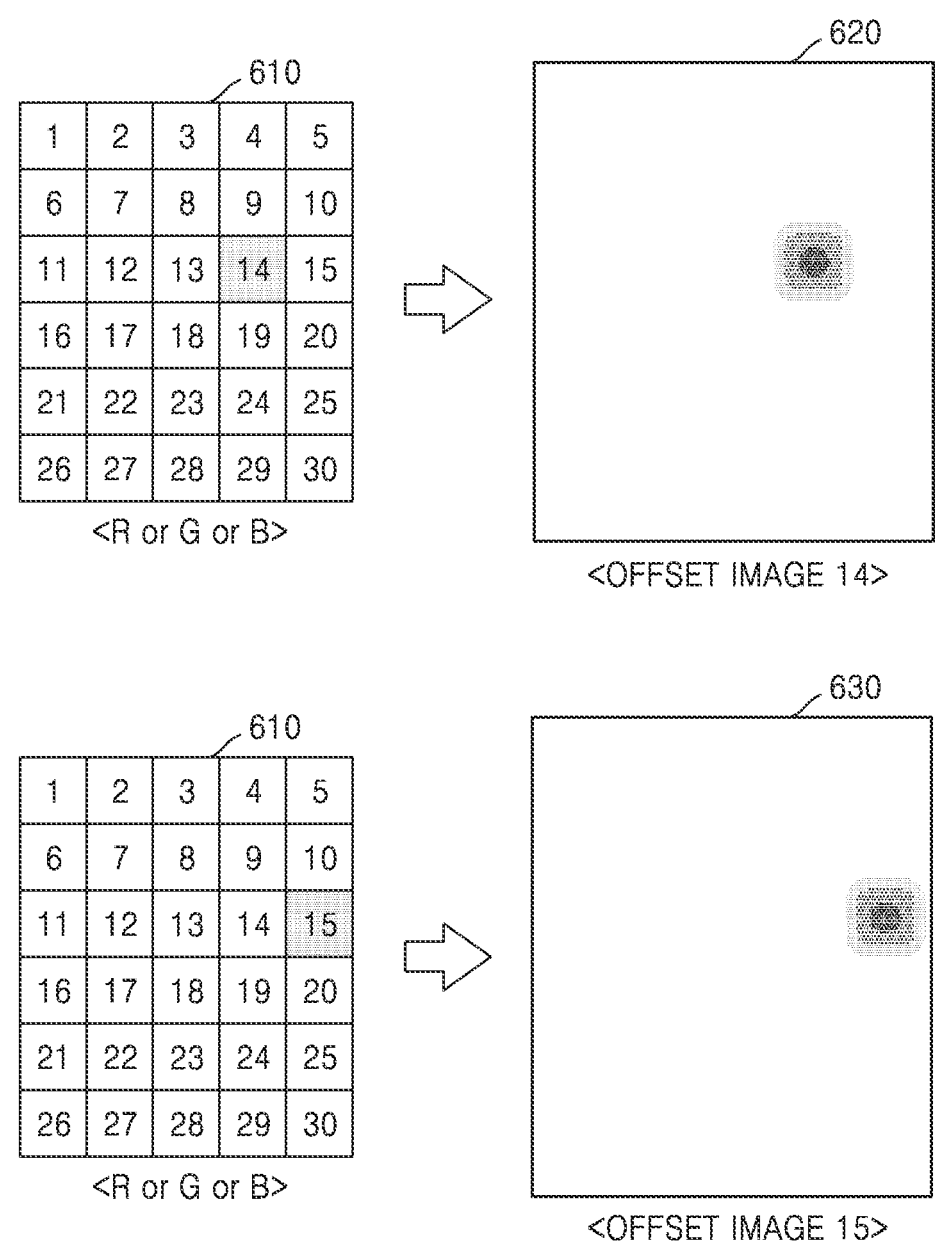
FIG. 6 is a diagram for describing an offset image used to correct a captured image, according to an embodiment of the disclosure.

FIG. 6 is a diagram for describing an offset image used to correct a captured image, according to an embodiment of the disclosure.

Referring to FIG. 6, the electronic device may divide an area of the display module corresponding to the camera module (hereinafter, a target display area 610) into a plurality of blocks. For example, the electronic device divides the target display area 610 into 6×5 blocks. Each block may include a plurality of target pixels.

The electronic device may store the offset information generated for each block while the target pixels included in the block are on in the form of an image. In an embodiment, the offset information may be stored for each average pixel value of the block for a certain color channel. For example, when the target pixels included in the fourteenth block are on, a light element is diffused to blocks around the fourteenth block. When an average pixel value for red R color of the target display area 610 is 'I' while the fourteenth block is on, the electronic device may store the offset information as offset image 14 620 to specify a value of the diffused light element. Furthermore, while the fifteenth block is on, the electronic device may store the offset information as offset image 15 630 when an average pixel value for R color of the target display area 610 is 'I'.

It is, however, merely an example, and the offset image may be stored for each color correction matrix of pixels of the block in another example. In another example, the offset image may be stored for each average value of degrees to which display devices connected to the pixels of the block emit light.

The electronic device may obtain the offset information by combining offset images with weights. For example, when an offset image for each color channel is stored for 6×5 blocks, a total of 3×6×5 offset images may be stored. The electronic device may combine at least some of the 3×6×5 offset images with weights. For example, when n of the 3×6×5 offset images are selected, the offset information is determined based on the following Equation 1:

$$O_{tot} = w_1 * O_1 + w_2 * O_2 + \ldots + w_n * O_n \qquad \text{Equation 1}$$

In Equation 1, $O_n$ indicates offset image n, $w_n$ indicates a weight for the offset image n, and $O_{tot}$ indicates offset information.

The weight may be determined in proportion to an average pixel value of the block. It is, however, merely an example, and the method of determining the weight is not limited to the above example. In another example, the same weight may be applied to all the offset images.

Figure 7:
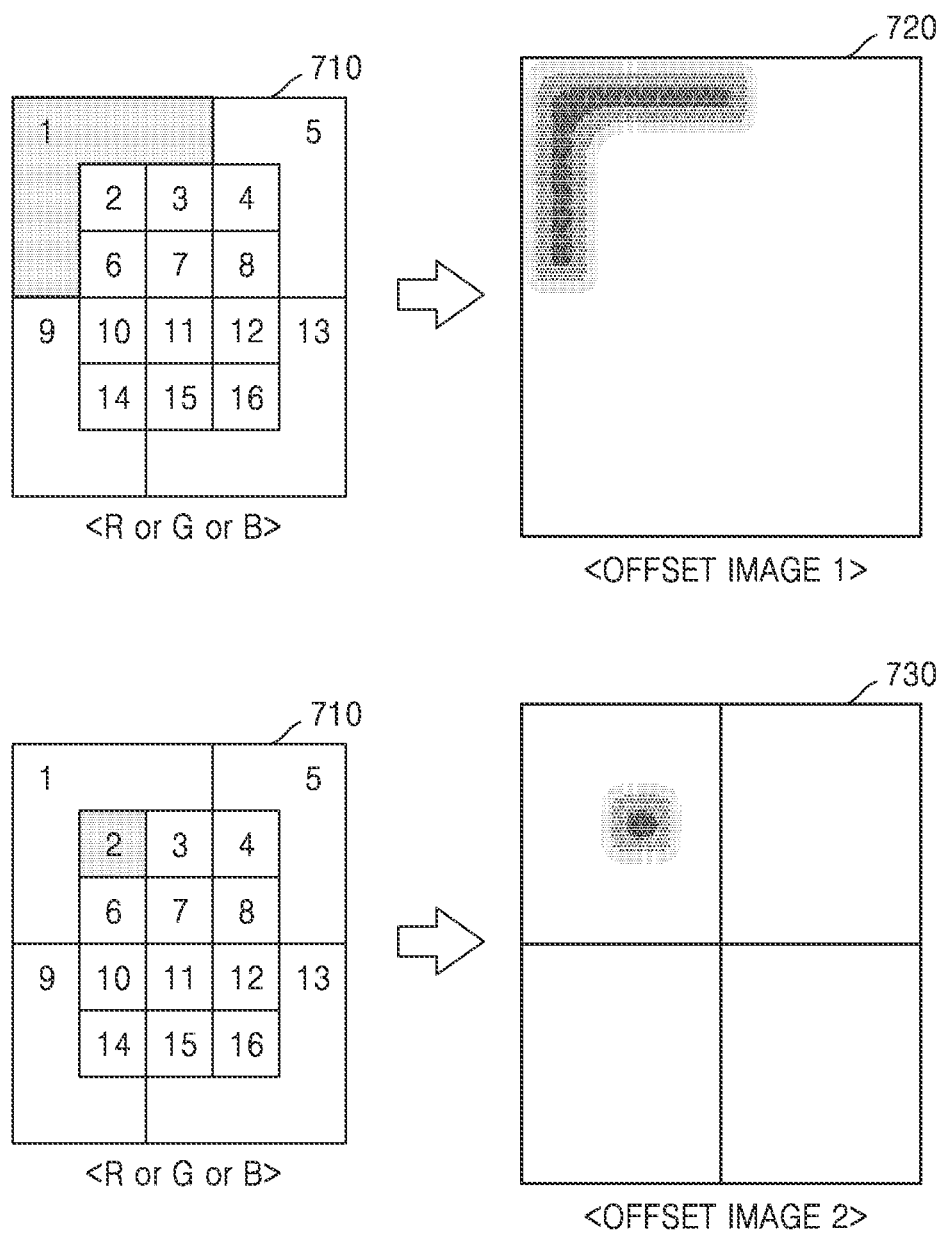
FIG. 7 is a diagram for describing an offset image used to correct a captured image, according to an embodiment of the disclosure.

FIG. 7 is a diagram for describing an offset image used to correct a captured image, according to an embodiment of the disclosure.

Referring to FIG. 7, the electronic device may divide an area of the display module corresponding to the camera module (hereinafter, a target display area 710) into a plurality of blocks. In an embodiment, the electronic device may differently set the number of target pixels included in each block. For example, target pixels located on an edge of a target display area 710 has little influence on the captured image as compared to target pixels located inside the target display area 710. Hence, the electronic device may group target pixels located on an edge of the target display area 710 and target pixels located inside the target display area 710 in different numbers. For example, for the target pixels located on an edge of the target display area 710, the electronic device groups x target pixels in one block. Furthermore, for the target pixels located inside the target display area 710, the electronic device may group y target pixels in one block.

The electronic device may store the offset information generated for each block while the target pixels included in the block are on in the form of an image. In an embodiment, the offset information may be stored for each average pixel value of the block for a certain color channel. For example, when an average pixel value for red R color of the target display area 710 is 'a' while the first block is on, the electronic device stores the offset information as offset image 1 720 to specify a value of the diffused light element when target pixels included in the first block are on. Furthermore, when an average pixel value for R color of the target display area 710 is 'b' while the second block is on, the electronic device may store the offset information as offset image 2 730.

It is, however, merely an example, and the offset image may be stored for each color correction matrix of pixels of the block in another example. In another example, the offset image may be stored for each average value of degrees to which display devices connected to the pixels of the block emit light.

The electronic device may obtain the offset information by combining offset images with weights. For example, when an offset image is stored for 16 blocks for each color channel, a total of 3×16 offset images are stored. The electronic device may combine at least some of the 3×16 offset images with weights.

The weight may be determined in proportion to an average pixel value of the block. It is, however, merely an example, and the method of determining the weight is not limited to the above example. In another example, the same weight may be applied to all the offset images.

Figure 8:
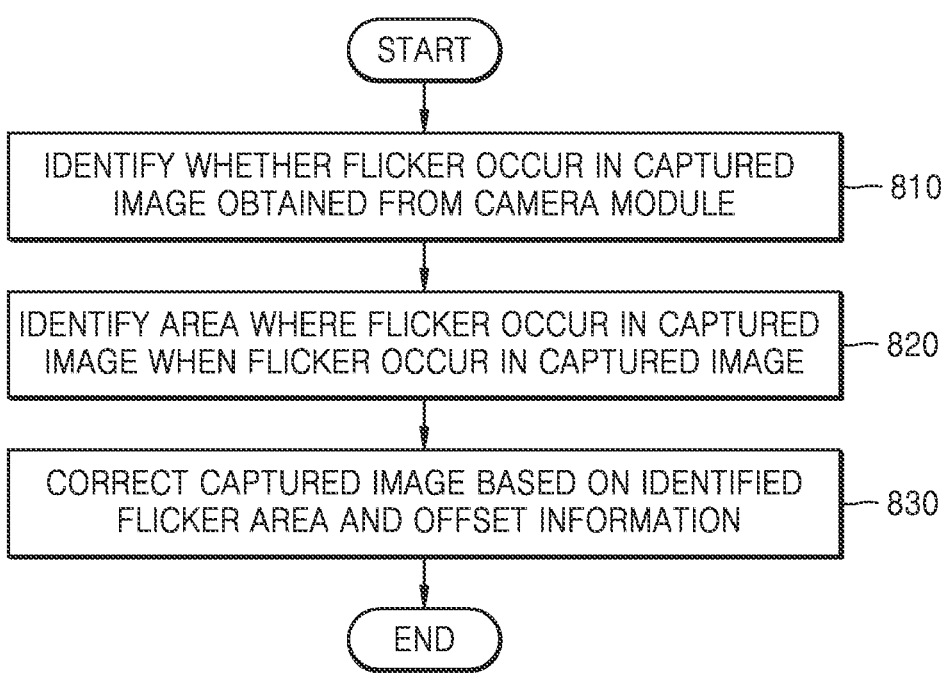
FIG. 8 is a flowchart for describing a method by which an electronic device corrects a captured image when flickers occur in the captured image, according to an embodiment of the disclosure.

FIG. 8 is a flowchart for describing a method by which an electronic device corrects a captured image when flickers occur in the captured image, according to an embodiment of the disclosure.

Referring to FIG. 8, in operation 810, the electronic device may identify whether flickers occur in a captured image obtained from the camera module. In an embodiment, the flicker may refer to a phenomenon in which horizontal stripes or vertical stripes are marked in the captured image when shutter speed of the camera module and the frequency of a light source are different. In an embodiment, the electronic device may identify that flickers occur when there is an area in the captured image where a difference between pixel values is equal to or greater than a threshold value. It is, however, merely an example, and the method by which the electronic device identifies whether the flickers occur is not limited to the above example. In another example, the electronic device may identify whether the flickers occur in a captured image by using an AI model generated to identify the flicker.

In operation 820, when there is the flicker in the captured image, the electronic device may identify an area where the flicker occurs in the captured image. For example, the electronic device may identify an area where the difference between pixel values is equal to or greater than a threshold value in the captured image as a flicker area. Furthermore, the electronic device detects flicker elements to be removed from the flicker area, and the flicker element to be removed may be quantified to a flicker value.

In operation 830, the electronic device may correct the captured image based on the identified flicker area and the offset information.

In the embodiment, the offset information is assumed to be determined based on the display information of the target pixels as described above in connection with FIGS. 5 to 7. For example, the electronic device obtains the offset information by combining the stored offset images with weights. The offset information may include offset values indicating light elements of the target pixels to be removed for the respective pixels constituting the captured image.

Furthermore, the electronic device may correct the captured image by using the flicker value and offset value corresponding to each pixel of the captured image. For example, the electronic device corrects the captured image by subtracting the offset value times the flicker value from the pixel value of the captured image.

Figure 9:
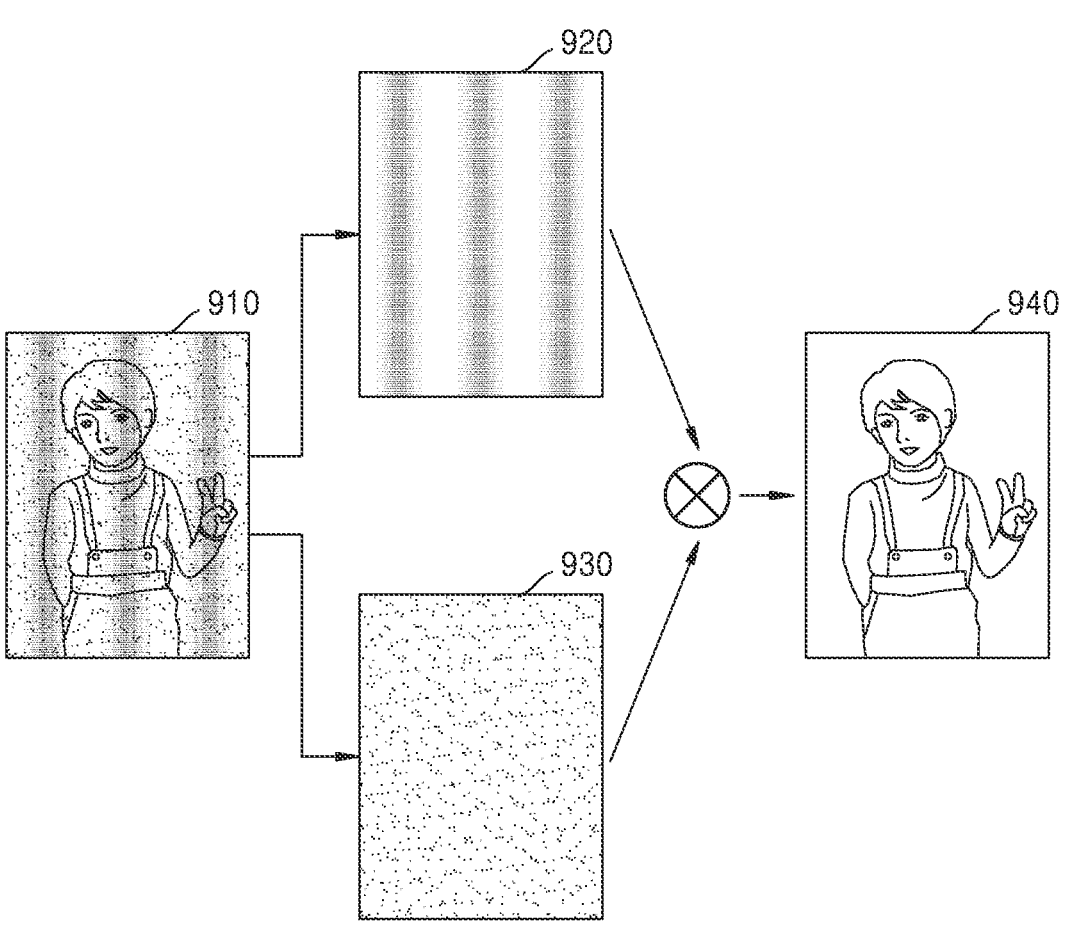
FIG. 9 is a diagram for describing a method by which an electronic device corrects a captured image when flickers occur, according to an embodiment of the disclosure.

FIG. 9 is a diagram for describing a method by which an electronic device corrects a captured image when flickers occur, according to an embodiment of the disclosure.

Referring to FIG. 9, the electronic device may obtain a captured image 910 from the camera module and identify whether flickers occur in the captured image 910. The electronic device may obtain flicker information 920 by analyzing pixel values of the captured image 910 when the flicker occurs. The flicker information 920 may include flicker values obtained by quantizing the flicker elements to be removed from the captured image 910.

In the meantime, the electronic device may obtain display information of target pixels when the target pixels included in an area of the display module corresponding to the camera module are on in obtaining the captured image 910 from the camera module. The electronic device may determine offset information 930 of pixels included in the captured image based on the display information of the target pixels. For example, the electronic device determines the offset information 930 by combining offset images of blocks comprised of target pixels with weights. It is, however, merely an example, and the method of determining the offset information 930 is not limited to the above example.

In an embodiment, the electronic device may obtain correction information for the captured image 910 by multiplying flicker values included in the flicker information 920 and offset values included in the offset information 930. The electronic device may correct the captured image 910 based on the obtained correction information. For example, the electronic device obtains corrected captured image 940 by subtracting a value of multiplication of the flicker values and the offset values from the captured image 910.

Figure 10:
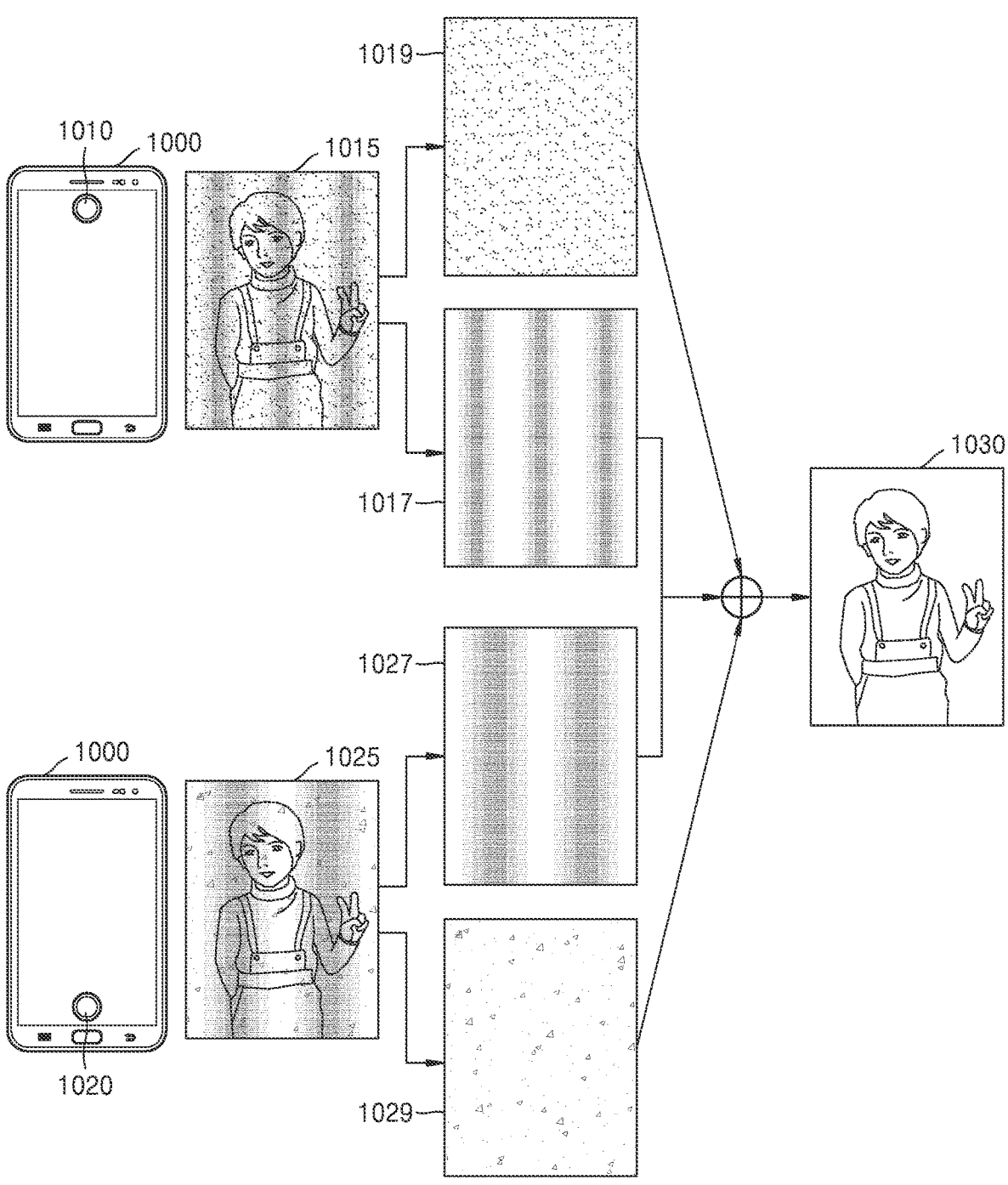
FIG. 10 is a flowchart for describing a method by which an electronic device including a plurality of camera modules corrects a captured image when flickers occur, according to an embodiment of the disclosure.

FIG. 10 is a flowchart for describing a method by which an electronic device including a plurality of camera modules corrects a captured image when flickers occur, according to an embodiment of the disclosure.

Referring to FIG. 10, an electronic device 1000 may include a plurality of camera modules 1010 and 1020. In the embodiment, all of the plurality of camera modules 1010 and 1020 are assumed to be located underneath the display module.

The electronic device 1000 may determine correction information based on captured images 1015 and 1025 obtained from the plurality of camera modules 1010 and 1020, respectively. For example, the electronic device 1000 obtains the first captured image 1015 from the first camera module 1010 and identify whether the flicker occurs in the first captured image 1015.

When the flicker occurs in the first captured image 1015, the electronic device 1000 may analyze pixel values of the first captured image 1015 to obtain first flicker information 1017. The first flicker information 1017 may include flicker values obtained by quantizing the flicker element to be removed from the first captured image 1015.

Furthermore, the electronic device 1000 may obtain display information of target pixels when the target pixels included in an area of the display module corresponding to the first camera module 1010 are on when the first captured image 1015 is obtained from the first camera module 1010. The electronic device 1000 may determine first offset information 1019 of pixels included in the captured image based on the display information of the target pixels. For example, the electronic device 1000 determines the offset information 1019 by combining offset images of blocks comprised of target pixels with weights.

Furthermore, the electronic device 1000 may obtain the second captured image 1025 from the second camera module 1020 and identify whether the flicker occurs in the second captured image 1025. When the flicker occurs in the second captured image 1025, the electronic device 1000 may analyze pixel values of the second captured image 1025 to obtain second flicker information 1027. The second flicker information 1027 may include flicker values obtained by quantizing the flicker element to be removed from the second captured image 1025.

Furthermore, the electronic device 1000 may obtain display information of target pixels when the target pixels included in an area of the display module corresponding to the second camera module 1020 are on when the second captured image 1025 is obtained from the second camera module 1020. The electronic device 1000 may determine second offset information 1029 of pixels included in the captured image based on the display information of the target pixels. For example, the electronic device 1000 determines the second offset information 1029 by combining offset images of blocks comprised of target pixels with weights.

In an embodiment, the electronic device 1000 may compare the first flicker information 1017 with the second flicker information 1027 to identify whether there is another cause of image quality degradation in addition to the flickers. For example, when it is identified that there is another cause of image quality degradation such as diffraction in addition to the flicker as a result of the comparing between the first flicker information 1017 and the second flicker information 1027, the electronic device 1000 separates the flicker element and the diffraction element.

After the separation of the flicker element and the diffraction element, the electronic device 1000 may obtain a pixel value to be removed from the captured image due to the respective causes of image quality degradation as a flicker value and a diffraction value. The electronic device 1000 may use the obtained flicker value and diffraction value, and offset values included in the first offset information 1019 and the second offset information 1029 to correct the first captured image 1015 or the second captured image 1025, and as a result, obtain a third captured image 1030.

Figure 11:
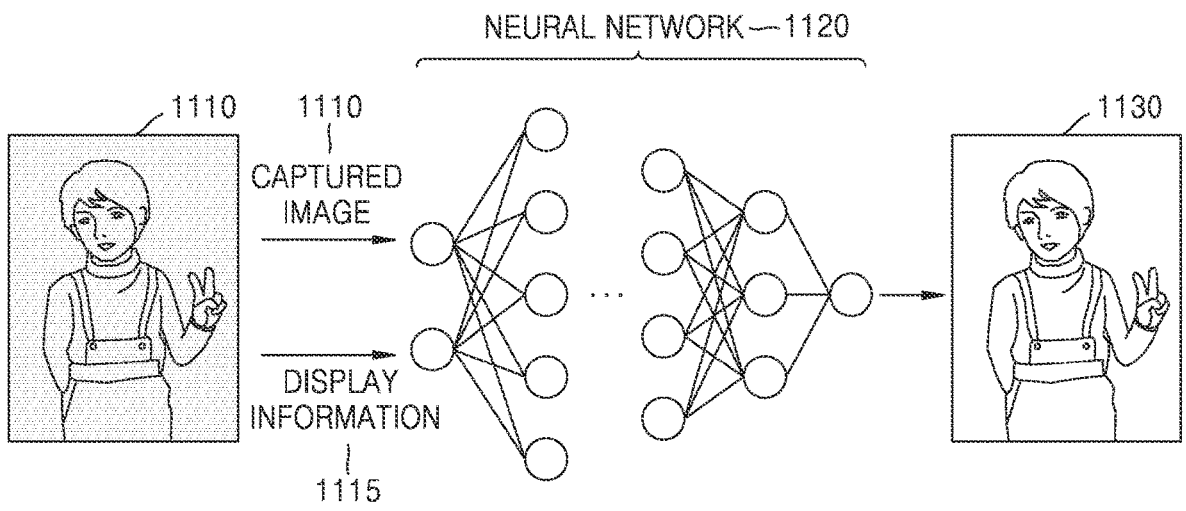
FIG. 11 is a diagram for describing a method by which an electronic device uses an artificial intelligence (AI) model to correct a captured image, according to an embodiment of the disclosure.

FIG. 11 is a diagram for describing a method by which an electronic device uses an AI model to correct a captured image, according to an embodiment of the disclosure.

Referring to FIG. 11, the electronic device may input a captured image 1110 and display information to an AI model including a neural network 1120 to obtain a corrected captured image 1130. Layers and nodes that constitute the neural network 1120 may be trained to determine offset information used to correct the captured image based on the captured image and the display information and correct the captured image based on the offset information. The display information may include at least one of pixel values for each color of target pixels included in an area of the display module corresponding to the camera module, degrees to which display devices corresponding to the target pixels emit light, or a color correction matrix.

In an embodiment, the AI model including the neural network 1120 may be stored in the electronic device or in an external electronic device. When the AI model is stored in the external electronic device, the electronic device may transmit the captured image 1110 and display information 1115 to the external electronic device. As the external electronic device completes correction of the captured image 1110 based on the captured image 1110 and the display information 1115 by using the AI model, the electronic device may receive the corrected captured image 1130 from the external electronic device.

In another embodiment, the electronic device may input the captured image subjected to a pre-process such as flicker elimination to the AI model, to remove a cause of image quality degradation other than the light generated from the target pixels of the display module. In another embodiment, the electronic device may also use the AI model to remove the cause of image quality degradation other than the light generated from the target pixels of the display module. This will be described in more detail with reference to FIG. 12.

Figure 12:
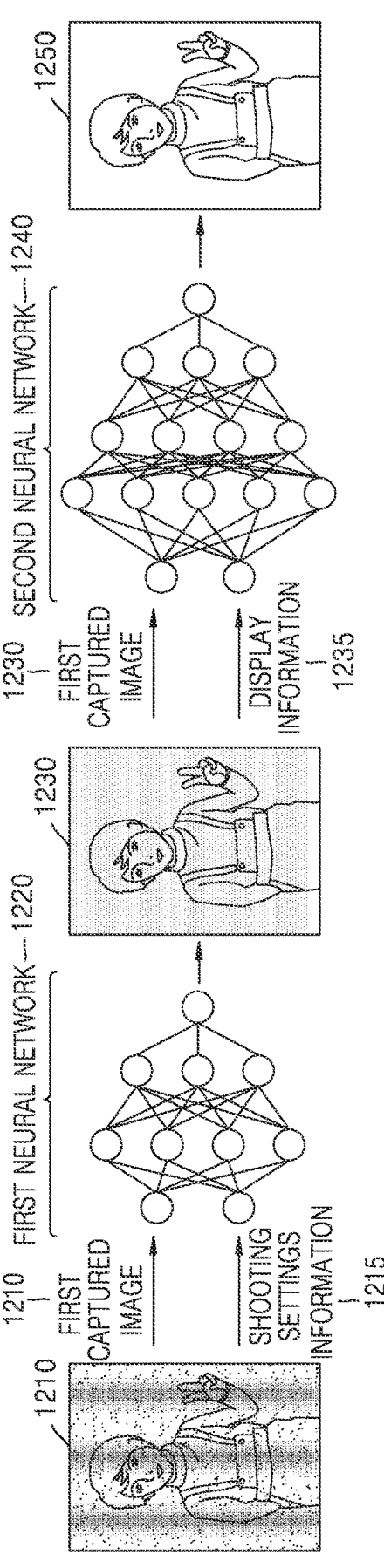
FIG. 12 is a diagram for describing a method by which an electronic device uses an AI model to correct a captured image, according to an embodiment of the disclosure.

FIG. 12 is a diagram for describing a method by which an electronic uses an AI model to correct a captured image, according to an embodiment of the disclosure.

Referring to FIG. 12, the electronic device may input a first captured image 1210 and shooting settings information to an AI model including a first neural network 1220 to perform correction, and as a result, obtain a second captured image 1230. Layers and nodes constituting the first neural network 1220 may be trained to determine correction information used to remove the cause of image quality degradation occurring due to a shooting condition based on the captured image and the shooting settings information. The shooting settings information may include information about settings (e.g., exposure time, read-out timing, shutter speed, etc.) of at least one of the aforementioned components included in the camera module as described above in connection with FIG. 2. In an embodiment, the AI model including the first neural network 1220 may be stored in the electronic device or in an external electronic device.

For example, the electronic device inputs the first captured image 1210 and the shooting settings information 1215 to the AI model including the first neural network 1220. The electronic device may obtain the second captured image 1230, which is equal to the first captured image 1210 with flickers removed therefrom, from the AI model including the first neural network 1220.

Furthermore, the electronic device may input the second captured image 1230 and display information 1235 to an AI model including a second neural network 1240 to perform correction, and as a result, obtain a third captured image 1250. Layers and nodes that constitute the second neural network 1240 may be trained to determine offset information used to correct the captured image based on the captured image and the display information and correct the captured image based on the offset information. In an embodiment, the AI model including the second neural network 1240 may be stored in the electronic device or in an external electronic device.

Figure 13:
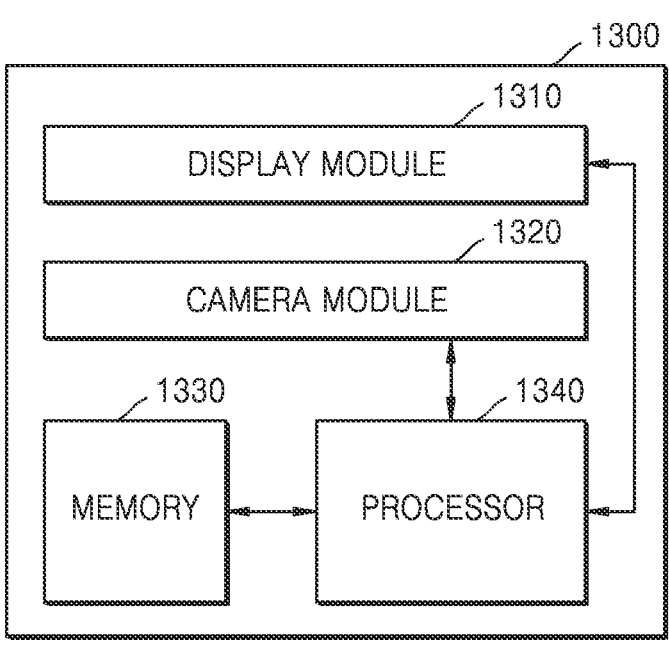
FIG. 13 is a block diagram of an electronic device, according to an embodiment of the disclosure.

FIG. 13 is a block diagram of an electronic device, according to an embodiment of the disclosure.

Referring to FIG. 13, the electronic device 1300 may include a display module 1310, a camera module 1320, a memory 1330 and at least one processor 1340. However, not all the illustrated components are essential. The electronic device 1300 may be implemented with more or fewer components than illustrated ones.

The display module 1310 may display information generated by the electronic device 1300 or information received by the electronic device 1300 from another electronic device. The display module 1310 may be comprised of a plurality of pixels including the aforementioned target pixels to display information, and may display the information with light generated from the pixels.

The camera module 1320 may be located underneath the display module 1310. An image may be captured by the camera module 1320. In an embodiment, the camera module 1320 may correspond to the aforementioned in FIGS. 2 and 3.

The memory 1330 may store one or more instructions for the electronic device 1300 to correct the captured image according to an embodiment. Furthermore, the memory 1330 may store the image captured by the camera module 1320.

The memory 1330 may store offset images of blocks of target pixels. The memory 1330 may also store an AI model trained to correct the captured image. The memory 1330 may also store the corrected captured image. It is, however, merely an example, and the memory 1330 may store the captured image obtained by the camera module and the offset information in another embodiment. For example, when the captured image is stored in a JPEG data file, the offset information is stored in a JPEG tail area. In another embodiment, the memory 1330 may store the captured image obtained by the camera module and the corrected captured image.

The processor 1340 may execute one or more instructions stored in the memory 1330 to correct the captured image.

The processor 1340 may identify status of target pixels included in an area of the display module 1310 corresponding to the camera module 1320 when the camera module 1320 is operated. The processor 1340 may obtain display information of the target pixels when the target pixels are on.

The processor 1340 may determine offset information of pixels included in a captured image obtained from the camera module 1320 based on the display information of the target pixels.

In an embodiment, the processor 1340 may determine offset information by combining display information of the target pixels based on preset weights.

In another embodiment, the processor 1340 may use offset information stored in advance for each block of target pixels to determine offset information for correcting the captured image. For this, the processor 1340 may group the target pixels into blocks of a preset size. For each block, the processor 1340 may obtain offset information included in an image captured by the camera while target pixels included in the block are on. The processor 1340 may determine offset information used for correcting the captured image based on at least one of pieces of offset information stored of the respective blocks.

In another embodiment, the processor 1340 may use the AI model to obtain offset information from the captured image and the display information of the target pixels.

In an embodiment, the processor 1340 may identify whether flickers occur in the captured image obtained from the camera. When the flickers occur in the captured image, the processor 1340 may identify a flicker area. The processor 1340 may correct the captured image based on the identified flicker area and the offset information.

In an embodiment, when the plurality of camera modules 1320 are underneath the display module 1310, the processor 1340 may determine offset information of the pixels included in the captured image based on values of target pixels corresponding to each of the plurality of camera modules 1320.

The processor 1340 may correct the captured image based on the determined offset information. In the meantime, the processor 1340 may not perform the technology to correct the captured image according to the embodiment when determining based on the at least one criterion as described above in connection with FIG. 4 to leave the pixels of the display module corresponding to the camera module off.

An electronic device according to various embodiments of the disclosure may be various types of devices. The electronic device may include, for example, a portable communication device (e.g., a smartphone), a computer device, a portable multimedia device, a portable medical device, a camera, a wearable device, or a home appliance. The electronic device according to embodiments of the disclosure is not limited to the aforementioned devices.

It is understood that various embodiments of the disclosure and associated terms are not intended to limit technical features herein to particular embodiments, but encompass various changes, equivalents, or substitutions. Throughout the specification, "A or B", "at least one of A and B", "at least one of A or B", "A, B or C", "at least one of A, B and C", and "A, B, or C" may each include any one or all the possible combinations of A, B and C. Terms like "first", "second", etc., may be simply used to distinguish an element from another, without limiting the elements in a certain sense (e.g., in terms of importance or order). When an element is mentioned as being "coupled" or "connected" to another element with or without an adverb "functionally" or "operatively", it means that the element may be connected to the other element directly (e.g., wiredly), wirelessly, or through a third element.

In various embodiments of the disclosure, the term "module", "device", "member", or "block" may refer to a unit implemented in hardware, software, or firmware, and may be interchangeably used with e.g., logic, logic block, part, or circuit. The module may be an integral part that performs one or more functions, or a minimum unit or a portion of the part. For example, in an embodiment, the module is configured with an application-specific integrated circuit (ASIC).

Various embodiments as set forth herein may be implemented as software (e.g., a program #40) including one or more instructions that are stored in a storage medium (e.g., an internal memory #36 or external memory #38) that is readable by a machine (e.g., an electronic device #01). For example, a processor (e.g., a processor #20) of a device (e.g., the electronic device #01) calls and executes at least one instruction from among the one or more instructions stored in the storage medium. This enables the device to be operated to perform at least one function according to at least one instruction called. The one or more instructions may include codes generated by a compiler or codes that may be executed by an interpreter. The computer-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily.

In an embodiment, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product may be at least temporarily stored or arbitrarily generated in a storage medium that may be readable to a device such as a server of the manufacturer, a server of the application store, or a relay server.

In various embodiments, each of the aforementioned components (e.g., a module or a program) may include a single entity or multiple entities, and some of the multiple entities may be separately arranged in another component. In various embodiments, one or more of the aforementioned components or operations may be omitted, or one or more of other components or operations may be added. Alternatively or additionally, a plurality of components (e.g., modules or programs) may be integrated into a single component. In this case, the integrated component may perform one or more functions of the respective components therein equally or similarly to what are performed by the plurality of components before integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of processing an image performed by an electronic device, the method comprising:
identifying that target pixels included in an area of a display panel corresponding to a camera module located underneath the display panel are on, when the camera module is operated in the electronic device;
obtaining display information of the target pixels;
determining offset information of pixels included in a captured image obtained from the camera module, based on the display information of the target pixels and offset information of at least one block among offset information of each of blocks, wherein the blocks are generated by grouping the target pixels; and
correcting the captured image, based on the determined offset information of the pixels.

2. The method of claim 1, wherein the offset information of each of the blocks is determined while target pixels included in each of the blocks are on.

3. The method of claim 1, further comprising:
storing the offset information of each of the blocks.

4. The method of claim 1, wherein the offset information of each of the blocks includes offset information for each red-green-blue (RGB) channel determined while target pixels included in each of the blocks are on for each RGB channel.

5. The method of claim 1, wherein the display information of the target pixels comprises at least one of pixel values for each color of the target pixels, degrees to which display devices corresponding to the target pixels emit light, or a color correction matrix.

6. The method of claim 1, further comprising:
identifying whether flickers occur in the captured image obtained from the camera module; and
identifying a flicker area in the captured image when the flickers occur in the captured image,
wherein the correcting of the captured image comprises correcting the captured image, based on the identified flicker area and the determined offset information of the pixels.

7. The method of claim 6, wherein the correcting the captured image comprises:
correcting at least one pixel included in the identified flicker area among pixels included in the captured image, based on a flicker value and an offset value of the at least one pixel.

8. The method of claim 1, wherein the determining offset information of the pixels comprises:
when there are a plurality of camera modules located underneath the display panel, determining offset information for each area on the captured image, based on values of target pixels included in each area of the display panel corresponding to each of the plurality of camera modules.

9. An electronic device for processing an image, the electronic device comprising:
memory configured to store instructions;
a display panel;
a camera module located underneath the display panel; and
at least one processor communicatively coupled to the memory, the display panel, and the camera module,
wherein the instructions, when executed by the at least one processor individually or collectively, cause the electronic device to:
identify that target pixels included in an area of the display panel corresponding to the camera module are on, when the camera module is operated,
obtain display information of the target pixels,
determine offset information of pixels included in a captured image obtained from the camera module, based on the display information of the target pixels and offset information of at least one block among offset information of each of blocks, wherein the blocks are generated by grouping the target pixels, and
correct the captured image, based on the determined offset information of the pixels.

10. The electronic device of claim 9, wherein the offset information of each of the blocks is determined while target pixels included in each of the blocks are on.

11. The electronic device of claim 9, wherein the offset information of each of the blocks includes offset information for each red-green-blue (RGB) channel determined while target pixels included in each of the blocks are on for each RGB channel.

12. The electronic device of claim 9, wherein the display information of the target pixels comprises at least one of pixel values for each color of the target pixels, degrees to which display devices corresponding to the target pixels emit light, or a color correction matrix.

13. The electronic device of claim 9, wherein the instructions, when executed by the at least one processor individually or collectively, further cause the electronic device to:

identify whether flickers occur in the captured image obtained from the camera module, identify a flicker area in the captured image when the flickers occur in the captured image, and correct the captured image, based on the identified flicker area and the determined offset information of the pixels.

14. The electronic device of claim 13, wherein the instructions, when executed by the at least one processor individually or collectively, further cause the electronic device to;

correct at least one pixel included in the identified flicker area among pixels included in the captured image, based on a flicker value and an offset value of the at least one pixel.

15. The electronic device of claim 9, wherein the instructions, when executed by the at least one processor individually or collectively, further cause the electronic device to:

when there are a plurality of camera modules located underneath the display panel, determine offset infor- mation for each area on the captured image based on values of target pixels included in each area of the display panel corresponding to each of the plurality of camera modules.

16. One or more non-transitory computer-readable storage media storing instructions that, when executed by at least one processor of an electronic device individually or collectively, cause the electronic device to perform operations, the operations comprising:

identifying that target pixels included in an area of a display panel corresponding to a camera module located underneath the display panel are on, when the camera module is operated in the electronic device;

obtaining display information of the target pixels;

determining offset information of pixels included in a captured image obtained from the camera module, based on the display information of the target pixels and offset information of at least one block among offset information of each of blocks, wherein the blocks are generated by grouping the target pixels; and correcting the captured image, based on the determined offset information of the pixels.

* * * * *